United States Patent Office 3,408,158
Patented Oct. 29, 1968

3,408,158
PROCESS FOR SEPARATING SELECTED POLY-PHOSPHORIC ACIDS FROM CONDENSED PHOSPHORIC ACID AND NOVEL COMPLEXES RESULTING THEREFROM
David R. Dyroff, Pasadena, Calif., and Chung Yu Shen, St. Louis, Mo., assignors to Monsanto Company, St. Louis, Mo., a corporation of Delaware
Filed Apr. 20, 1964, Ser. No. 361,161
19 Claims. (Cl. 23—105)

ABSTRACT OF THE DISCLOSURE

A method is described for separating a polyphosphoric acid from condensed phosphoric acid by contacting the condensed phosphoric acid with a water-insoluble amine compound containing a terminal polar nitrogen containing group and at least one hydrophobic group, the amine compound being used in amounts to form an amine-polyphosphoric acid complex with a polyphosphoric acid and separating the amine-polyphosphoric acid complex and the condensed phosphoric acid.

This invention pertains to separating selected polyphosphoric acids from condensed phosphoric acid, and, more particularly, to recovering selected polyphosphate values from condensed phosphoric acid by novel extraction methods, and to the novel complexes resulting therefrom.

In conventional and customarily used processes polyphosphate salts, such as pyrophosphate and tripolyphosphate salts, are made by the conversion of an appropriate orthophosphate solution at high temperatures to remove both the free water and the chemically bound water. Usually, the appropriate orthophosphate solution is prepared by utilizing as one of the starting materials orthophosphoric acid. A serious disadvantage to this method is the large amount of energy required in the dehydration steps while an even larger amount of energy is usually dissipated when the phosphorus is converted to the usual starting material, that is, orthophosphoric acid. A method which would appear to offer advantages is to utilize as one of the starting materials condensed phosphoric acid and directly convert such an acid to the desired polyphosphate salt, however, a major limitation to this method is that condensed phosphoric acid usually contains a mixture of phosphoric acid polymers of various chain lengths, and, therefore, the direct conversion to the desired polyphosphate salt is not possible. Such a method would, it is believed, offer many advantages if a process could be found which is capable of separating selected polyphosphoric acids from condensed phosphoric acid.

Therefore, it is a prime object of this invention to provide a process for separating selected polyphosphoric acids from condensed phosphoric acid.

Another object of this invention is to provide a process for recovering selected polyphosphate values from condensed phosphoric acids.

A still further object of this invention is to provide a process for recovering selected polyphosphate values from condensed phosphoric acid by novel extraction methods.

And a still further object of this invention is to provide novel complexes resulting from the extraction of selected polyphosphoric acids from condensed phosphoric acid.

These and other objects will become more apparent from the following detailed description.

This invention, in general, pertains to separating selected polyphosphoric acids from condensed phosphoric acid by novel extraction methods utilizing an organic amine compound, preferably dissolved in an organic diluent, as a selective extractant for separating a desired polyphosphoric acid and/or polyphosphoric acids from an acidic source comprised of phosphoric acid and/or phosphoric acid polymers of various chain lengths by forming a water-insoluble amine complex of the desired polyphosphoric acid and/or polyphosphoric acids and separating the polyphosphate values from the amine extractant as will be more fully discussed hereinafter. In addition, the invention pertains to the novel amine-polyphosphoric acid complexes formed which are useful as intermediates in preparing polyphosphate salts such as the alkali metal polyphosphate salts as will be more fully discussed hereinafter.

Although the following description is primarily concerned with separating phosphoric acid constituents contained in condensed phosphoric acid, it should be noted that the instant invention is capable of separating, in general, any mixture of polyphosphoric acids, however, it is especially adaptable to separating polyphosphoric acids contained in a condensed phosphoric acid. In addition, the condensed phosphoric acid can be either impure condensed phosphoric acid, such as, condensed phosphoric acid produced by the wet method which essentially entails the acidulation of phosphate rock by the use of acids, such as sulfuric acid, followed by concentrating the acid to the desired condensed acid; or relatively pure condensed phosphoric acid, such as furnace grade condensed phosphoric acid with furnace grade acid being preferred.

Condensed phosphoric acid is a phosphoric acid containing any quantity of one or more polyphosphoric acids and any such acid can be employed in this invention. The polyphosphoric acids include pyrophosphoric acid and other polymers from the tri to the nonapolymer and higher. The properties and compositions of the polyphosphoric acids vary with the $P_2O_5$ content of the condensed phosphoric acid as discussed in Van Wazer, Phosphorus and Its Compounds, Interscience Publishers, Inc. New York, N.Y., vol. 1 (1958), and shown by table 12–1, page 748. Although, in general, for the instant invention any condensed phosphoric acid is suitable as the acid source, the preferred condensed phosphoric acids are liquid mixtures ranging from about 72 percent $P_2O_5$ by weight which contains about 89.4 percent orthophosphoric acid and 10.6 percent pyrophosphoric acid to about 85 percent $P_2O_5$ by weight which contains about 1.3 percent orthophosphoric acid, 1.8 percent pyrophosphoric acid, 2.4 percent tripolyphosphoric acid, and about 94 percent of polyphosphoric acid polymers higher than tripolyphosphoric acid.

Condensed phosphoric acid may be prepared by dissolving quantities of $P_2O_5$ in orthophosphoric acid, by evaporating water from orthophosphoric acid, or by operating equipment ordinarily used for the manufacture of orthophosphoric acid from phosphorus by reacting less water with the $P_2O_5$ produced than is normally required for the manufacture of orthophosphoric acid.

The organic amine compounds, that is, the amines, quaternary ammonium compounds and salts thereof, suitable for use in the present invention are, in general, water-insoluble and/or capable of forming desired water-insoluble complexes and especially the monoamine compounds having molecular weights from about 200 to about 650. In particular, amine compounds containing a terminal polar nitrogen containing group and at least 1 hydrophobic substituent group, such as those comopunds derived from fatty acids of varying molecular weights and different degrees of saturation, are suitable for use. Especially suitable amine compounds are the secondary and tertiary amines, as well as quaternary ammonium compounds, and the salts thereof. In particular, secondary and tertiary aliphatic amines having two substituent groups, each containing about 7 to about 15 carbon atoms, and including branch chain structures as well as straight chain structures, are quite suitable for use in the present invention. Mixtures of amines are suitable when containing to a predominant extent the foregoing structures. It should be noted that for tertiary aliphatic amines the third substituent group may contain any number of carbon atoms but preferably should not contain over about 15 carbon atoms. Further, the OH, COOH, OCH₃, halogen, NO₂ and SO₃ substituted derivatives of the substituent groups may, in most cases, be used, as well as the substituent groups containing alkoxy radicals, as long as at least one of the groups is hydrophobic, thus rendering the compound water-insoluble to the desired degree. The primary aliphatic amines, however, are less suitable because of their tendency to precipitate as the amine salts when in contact with the condensed phosphoric acid. The secondary or tertiary aliphatic amines containing less than about 7 carbon atoms on each of at least two substituent groups are also less suitable since they exhibit the undesirable tendency to be water-soluble. The secondary or tertiary aliphatic amines containing more than about 15 carbon atoms on each of at least two substituent groups are less suitable since they exhibit the undesirable tendency to form salts which are relatively insoluble in the extractant phase. Aromatic amines, whether primary, secondary or tertiary, are less suitable because they exhibit undesirable tendencies, such as either poor extracting properties, poor water-insoluble salt forming properties or poor salt solubilities in the extractant phase.

The term "water-insoluble" as used herein with respect to the amines including the quaternary ammonium compounds, does not necessarily require complete insolubility. It merely requires that the material be sufficiently immiscible with an aqueous solution to allow physical separation of the liquids into two distinct phases.

The preferred amines useful as extractants are long chain hydrocarbyl amines of the following formula

(1)

wherein $R_1$ and $R_2$ are members selected from the class consisting of saturated and ethylenically unsaturated aliphatic hydrocarbyl groups containing from about 7 to about 15 carbon atoms and $R_3$ is a member selected from the class consisting of hydrogen and saturated and ethylenically unsaturated aliphatic hydrocarbyl groups containing from 1 to about 18 carbon atoms.

The preferred quaternary ammonium compounds useful as extractants are long chain hydrocarbyl quaternary ammonium compounds of the following formula (2)

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated aliphatic hydrocarbyl groups from 1 to about 18 carbon atoms, and $R_4$ is a member selected from the class consisting of saturated and ethylenically unsaturated aliphatic hydrocarbyl groups from 1 to about 15 carbon atoms.

In addition, it should be noted that the salts of the foregoing amines and quaternary ammonium compounds can be used in the instant invention as the amine extractant. In general, the amine and quaternary ammonium salts which are suitable can be formed from any organic and inorganic acid, such as hydrochloric acid, nitric acid, sulfuric acid and the like, although it is preferred that the amine and quaternary ammonium salts be formed from those acids which are weaker than phosphoric acid, i.e., having a pKa less than about $8 \times 10^{-3}$, especially the inorganic acids such as carbonic acid and the like. Ionization constant of an acid (pKa) as used herein refers to the dissociation of an acidic electrolyte at room temperature, i.e., about 25° C., and is equal to the product of the activities of each of the ions produced by the dissociation (if more than one ion of a given kind is produced, its activity is raised to the corresponding power) divided by the activity of the undissociated molecules with the activities assumed to be in their standard states at infinite dilution.

The following are representative of suitable extractants for use in the present invention.

Di-n-decylamine, $[CH_3(CH_2)_9]_2NH$
Tri-n-octylamine, $[CH_3(CH_2)_7]_3N$
Methyldioctylamine, $[CH_3(CH_2)_7]_2(CH_3)N$
Dimethyldioctyl ammonium hydroxide $$[[CH_3(CH_2)_7](CH_3)_2N]^+OH^-$$

Di-n-dodecylamine, $[CH_3(CH_2)_{11}]_2NH$
Tri-n-dodecylamine, $[CH_3(CH_2)_{11}]_3N$
Dimethyldidodecyl ammonium hydroxide $$[[CH_3(CH_2)_{11}]_2(CH_3)_2N]_+OH^-$$

Tricaprylyl amine, $R_3N$, where R is a mixture of $C_8H_{17}$ and $C_{10}H_{21}$ but predominantly $C_8H_{17}$
Tri-isooctyl amine, $[CH_3(CH_2)_7]_3N$, where $C_8H_{17}$ groups are comprised of mixed isomers
N,N-didodecenyl-N-n-butyl amine, $(C_4H_9)(C_{12}H_{23})_2N$
N-dodecenyl-N-trialkylmethyl amine $$(C_{12}H_{23})(R_1R_2R_3C)NH$$

where $R_1+R_2+R_3$ equal $C_{11}H_{23}$ or $C_{14}H_{29}$
N-lauryl-N-trialkylmethyl amine $$(C_{12}H_{26})(R_1R_2R_3C)NH$$

where $R_1+R_2+R_3$ equal $C_{11}H_{23}$ or $C_{14}H_{29}$
Tricoco amine, $R_3N$, where R is a mixture of 15% $C_8H_{17}$ to $C_{10}H_{21}$, 48% $C_{12}H_{25}$, 18% $C_{14}H_{29}$, 9% $C_{16}H_{33}$, 10% $C_{18}H_{37}$ (stearyl-oleyl)
Trilauryl amine, $R_3N$, where R is a mixture of 88% $C_{12}H_{26}$, 10% $C_{14}H_{29}$ isomers, 2% $C_{10}H_{21}$
Trialkyl methyl amine, $R_1R_2R_3C-NH_2$, where $R_1+R_2+R_3$ equal $C_{17}H_{35}$ to $C_{24}H_{49}$
Tris(tridecyl)amine, $(C_{13}H_{27})_3N$
Methyl dodecyl tolyl amine $$(C_{12}H_{25} \cdot C_6H_3(CH_3)(CH_2)(CH_3)(H)N$$

Didodecenyl methyl amine, $[C_{12}H_{23})_2][CH_3]N$
Dodecenyl-di-2-ethyl hexylamine, $(C_{12}H_{23})\cdot(C_8H_{17})_2N$
Tridodecenyl amine, $(C_{12}H_{23})_3N$
Methyl tris(tridecyl) ammonium hydroxide $$[CH_3(C_{13}H_{27})_3N]^+OH^-$$

Didodecenyl dimethyl ammonium hydroxide $$[C_{12}H_{23})_2(CH_3)_2N]^+OH^-$$

Butyl tridodecenyl ammonium hydroxide $$[C_{12}H_{23})_3(C_4H_9)N]^+OH^-$$

It is preferred that the amine compounds be utilized for extraction purposes in conjunction with an organic diluent for greater ease in handling and extracting control. In general, organic diluents which are suitable for use in the present invention are organic solvents in which the amine compounds are quite soluble and, in addition, are substantially water insoluble. A wide range of organic solvents are effective including kerosene, mineral spirits, naphtha, benzene, xylene, toluene, nitrobenzene, carbon tetrachloride, chloroform, trichloroethylene and the like.

In some instances it is highly desirable to add minor amounts of suitable additives to increase the solubility of the amine compound in certain organic solvents. Additives which have been especially effective as solubilizing agents are, in general, water-insoluble alcohols which are soluble in the organic diluent and preferably are monohydric higher aliphatic alcohols containing about 6 to about 20 carbon atoms; especially preferred are the primary alcohols containing not more than 15 carbon atoms. For example, tri-n-octylamine bisulfate, about 10% by total volume, is rendered more soluble in kerosene by the addition of about 5% by total volume of n-decyl alcohol as an additive. Suitable alcohols include 1-hexanol, 4-methyl-2-pentanol, 2-ethyl-1-butanol, 2-heptanol, 1-octanol, 5-ethyl-2-nonanol, 1-dodecanol, 1-tetradecanol and the like.

The extraction processes, as well as the stripping processes, may be carried out in batches in which case it may be necessary to repeat the extraction until the desired advantageous degree of extraction is reached. However, the processes may be caired out in a continuous operation, with counter-current contact of the condensed phosphoric acid with the amine extractant, or in any other continuous manner.

This invention takes advantage of the selective extraction capability of the amine compounds, and, in general, it has been found that the order of selectivity is from the higher polyphosphoric acids to orthophosphoric acid, for example, the selectivity in descending order is tripolyphosphoric acid>pyrophosphoric acid>orthophosphoric acid. It is therefore possible, for example, to extract selectively from a condensed phosphoric acid containing orthophosphoric acid, pyrophosphoric acid and tripolyphosphoric acid; first the tripolyphosphoric acid, next the pyrophosphoric acid and finally the orthophosphoric as well as extracting mixtures, such as extracting a mixture of tripolyphosphoric acid and pyrophosphoric acid from orthophosphoric acid.

It should be noted that the amine compounds which are suitable for use in the instant invention are believed to function by forming amine complexes or addition salts with the polyphosphoric acid, such as represented by the following equation:

(3) $(R_3N)\text{org} + H^+ A^- \rightleftarrows (R_3N \cdot HA)\text{org}$ where the ions $H^+$ and $A^-$ refer to the aqueous phase and "org" refers to the amine or amine salt dissolved in the organic phase.

In addition, an amine salt exchange mechanism can operate, such as represented by the following equation:

(4) $(R_3N \cdot HA)\text{org} + H^+ B^- \rightleftarrows (R_3N \cdot HB)\text{org} + HA$ where the ions $H^+$ and $B^-$ refer to the aqueous phase and "org" refers to the amine salt dissolved in the organic phase.

It is also believed that a further mechanism can operate, i.e., a solvating action, especially where the amine complex has been formed, which appears to be less selective for a particular phosphoric acid and can be represented by the following equation:

(5) $[R_3N \cdot HA]\text{org} + H^+ B^- \rightleftarrows [(R_3N \cdot HA) \cdot HB]\text{org}$ where the ions $H^+$ and $B^-$ refer to the aqueous phase and "org" refers to the amine salt or solvated amine salt dissolved in the organic phase.

In order to selectively extract the desired polyphosphoric acid from a condensed phosphoric acid, it is important that the solvating mechanism, i.e., Equation 5, be avoided as much as possible, otherwise the desired amine complex can contain objectionable amounts of other constituent acids of the condensed phosphoric acid and thereby seriously restrict the selectivity of the amine extractant.

The amine complex formation is, in general, dependent upon, inter alia, the particular amine extractant used, the amine concentration, the condensed phosphoric acid concentration and the pH of the equilibrium aqueous phase. Therefore, it is important that process conditions be used with avoid the solvating mechanism, i.e., Equation 5, and which are suitable for preparing the amine complex of the desired polyphosphoric acid, and such can readily be determined by conducting equilibrium distribution tests on the particular extractant and condensed phosphoric acid to be used in order to determine the degree of extraction which is desired.

As previously mentioned, the novel amine-polyphosphoric acid addition compounds, that is, complexes or addition salts and herein referred to as complexes, are useful intermediates in preparing polyphosphate salts and, in addition, exhibit highly unusual and unexpected properties. One such property which is highly significant is the hydrolytic stability of the amine-polyphosphoric acid complexes. As illustrative of this stability the following is presented: a tri-n-octyl amine-pyrophosphoric acid complex was subjected to boiling conditions in water for 2 hours and then analyzed as to the pyrophosphoric acid content. Substantially all of the pyrophosphoric acid was still present in the amine-pyrophosphoric acid complex and thus was not degraded under the foregoing stringent conditions. It is well known in the art that polyphosphoric acids are subject to hydrolysis with the hydrolysis rate increasing with increased temperature and concentration. For example, a crystalline pyrophosphoric acid at about 5% concentration in water and 100° C. exhibits a hydrolysis rate of about 10 minutes for a half-life time and at higher concentrations, such as 75% concentration, the rate is even faster i.e., about 2 minutes for a half-life time.

Another such property which is highly significant is the reorganization stability of the amine-polyphosphoric acid complexes. Such complexes are stable for long periods of time, that is, for 6 months and longer, against reorganization of the polyphosphoric acid into phosphoric acid molecules containing different degrees of polymerization. However, pure polyphosphoric acids in the liquid or melt form are subject to reorganization. For example, pure pyrophosphoric acid will reorganize upon melting to a mixture of about 20% ortho, 46% pyro, 21% tripoly and 14% long chain polyphosphoric acids.

The novel amine-polyphosphoric acid complexes exhibit an infrared spectra (Beckman model IR–4 spectrophotometer) showing the following polyphosphate linkages and amine-salt formation characteristics:

| Possible Mode | Approx. Frequency, cm.$^{-1}$ | Reference |
|---|---|---|
| N—H$^+$—X$^-$ stretching | 2,300–2,400 | (1) |
| P—O—P linkage | 870–1,000 | (2), (3) |

(1) Lord and Merrifield, J. Chem. Phy., 21, 166 (1953).
(2) L. J. Bellamy "The Infrared Spectra of Complex Molecules," John Wiley and Sons, Inc., N.Y., second ed., 1959.
(3) D.E.C. Cobridge, J. Appl. Chem., 6, 456 (1956).

The amine-polyphosphoric acid complexes can be thought of as being equivalent to salt-like ion-pairs. However, the amount of amine and polyphosphoric acid which can react varies with, inter alia, the amount of amine, pH of the equilibrium distribution aqueous phase and certain steric effects due to the structure of the complex. In general, it has been observed that a maximum of 1 mole of amine per 1 equivalent atomic weight of phosphorus is involved in the salt-like ion-pair formation.

For the amine compounds which are preferred in extracting the selected polyphosphoric acids, the following formula is believed to represent the amine-polyphosphoric acid complex formed thereby:

(6)

wherein $R_1$, $R_2$ and $R_3$ represent the same radicals as the foregoing formula 1, $n$ is an integer from 2 to about 10 and $x$ is an integer from 1 to $n$.

Such amine-polyphosphoric acid complexes include the following:

Di-n-decylamine-pyrophosphoric acid complex,
$$[CH_3(CH_2)_9]_2NH—H_4P_2O_7$$

Di-n-decylamine-tripolyphosphoric acid complex,
$$[[CH_3(CH_2)_9]_2NH]_n—H_5P_3O_{10}$$
$n=1$ to 3

Tri-n-octyl amine-pyrophosphoric acid complex,
$$[[CH_3(CH_2)_7]_3N]_n—H_4P_2O_7$$
$n=1$ to 2

Tri-n-octyl amine-tripolyphosphoric acid complex,
$$[[CH_3(CH_2)_7]_3N]_n—H_5P_3O_{10}$$
$n=1$ to 4

Tricoco amine-hexapolyphosphoric acid complex,
$$[R_3N]_n \cdot H_8P_6O_{19}$$
$n=1$ to 4, R is a mixture of 15% $C_8H_{17}$ to $C_{10}H_{21}$, 48% $C_{12}H_{25}$, 18% $C_{14}H_{29}$, 9% $C_{16}H_{33}$, 10% $C_{18}H_{37}$ (stearyl-oleyl)

Tricoco amine-octapolyphosphoric acid complex,
$$[R_3N]_n \cdot H_{10}P_8O_{25}$$
$n=1$ to 6, R is a mixture of 15% $C_8H_{17}$ to $C_{10}H_{21}$, 48% $C_{12}H_{25}$, 18% $C_{14}H_{29}$, 9% $C_{16}H_{33}$, 10% $C_{18}H_{37}$ (stearyl-oleyl)

Tricaprylyl amine-pyrophosphoric acid complex,
$$[R_3N]_n—H_4P_2O_7$$
$n=1$ to 2, $R_3$ is a mixture of $C_8H_{17}$ and $C_{10}H_{21}$ but predominantly $C_8H_{17}$ Tricaprylyl amine-tripolyphosphoric acid complex,
$$(R_3N)_n—H_5P_3O_{10}$$
$n=1$ to 3, R is a mixture of $C_8H_{17}$ and $C_{10}H_{21}$ but predominantly $C_8H_{17}$ Tri-n-dodecyl amine-pentapolyphosphoric acid complex,
$$[[CH_3(CH_2)_{11}]_3N]_nH_7P_5O_{16}$$
$n=1$ to 3

Di-n-dodecyl amine-tetrapolyphosphoric acid complex,
$$[[CH_3(CH_2)_{11}]_2NH]_n—H_6P_4O_{13}$$
$n=1$ to 2

Methyl dioctyl amine-decapolyphosphoric acid complex,
$$[[CH_2(CH_{27})]_2(CH_3)N]_n—H_{12}P_{10}O_{31}$$
$n=1$ to 5

Tris(tridecyl)amine-heptapolyphosphoric acid complex,
$$[(C_{13}H_{27})_3N]_n—H_9P_7O_{22}$$
$n=1$ to 4

Tris(tridecyl)amine-octapolyphosphoric acid complex,
$$[(C_3H_{27})_3N]_n—H_{10}P_8O_{25}$$
$n=1$ to 6.

For the quaternary ammonium compounds which are preferred in extracting the selected polyphosphoric acids, the following formula is believed to represent such an amine-polyphosphoric acid complex formed thereby:

$$\left[ \begin{array}{c} R_1 \\ R_2 \\ R_3 \end{array} \!\!\!\! >\!\!N\!\!-\!\!R_4 \right]_x^+ \cdot [H_{n+2}P_nO_{3n+1}]^-$$

wherein $R_1$, $R_2$, $R_3$ and $R_4$ represent the same radicals as the foregoing formula 2, $n$ is an integer from 2 to about 10 and $x$ is an integer from 1 to $n$.

Such amine-polyphosphoric acid complexes include the following:

Dimethyl dioctyl ammonium-pyrophosphoric acid complex,
$$[[CH_3(CH_2)_7](CH_3)_2N]_n—H_4P_2O_7$$
$n=1$ to 2

Dimethyl dioctyl ammonium-tripolyphosphoric acid complex,
$$[[CH_3(CH_2)_7](CH_3)_2N]_n—H_5P_3O_{10}$$
$n=1$ to 2

Methyl tridodecyl ammonium-heptapolyphosphoric,
$$[[CH_3(CH_2)_{11}]_3(CH_3)N]_n—H_9P_7O_{22}$$
$n=1$ to 4

Methyl tridodecyl ammonium-tetrapolyphosphoric acid complex,
$$[[CH_3(CH_2)_{11}]_3(CH_3)N]_n—H_6P_4O_{13}$$
$n=1$ to 2

Didodecenyl dimethyl ammonium-pentapolyphosphoric acid complex,
$$[(C_{12}H_{23})_2(CH_3)_2N]_n—H_7P_5O_{16}$$
$n=1$ to 3

Didodecenyl dimethyl ammonium-octapolyphosphoric acid complex,
$$[(C_{12}H_{23})_2(CH_3)_2N]_n—H_7P_5O_{16}$$
$n=1$ to 5

Butyl tridodecenyl ammonium-tripolyphosphoric acid complex,
$$[(C_{12}H_{23})_3(C_4H_9)N]_n—H_5P_3O_{10}$$
$n=1$ Butyl tridodecenyl ammonium-nonapolyphosphoric acid complex,
$$[(C_{12}H_{23})_3(C_4H_9)N]_n—H_{11}P_9O_{28}$$
$n=1$ to 4

Methyl tris(tridecyl)ammonium-decapolyphosphoric acid complex,
$$[CH_3(C_{13}H_{27})_3N]_n—H_{12}P_{10}O_{31}$$
$n=1$ to 6

Methyl tris(tridecyl)ammonium - pyrophosphoric acid complex,
$$[CH_3(C_{13}H_{27})_3N]_n—H_4P_2O_7$$
$n=1$ to 2.

There are, in general, two methods which can be used in separating the various constituents acids of condensed phosphoric acid; namely, (1) leaching method and (2) fractionating method.

I. LEACHING METHOD

In general, the leaching method comprises admixing the amine extractant, preferably in a diluent, and the condensed phosphoric acid with the amine compound being used in concentrations to form the desired amine polyphosphoric acid complex and leaching the admixture, preferably counter-currently, with a suitable aqueous solvent to remove as phosphate values, i.e., either as phosphoric acid and/or phosphate salts, the undesired constituents of the condensed phosphoric acid. The desired amine-polyphosphoric acid complex can then be stripped to recover the desired polyphosphate values, i.e., either as polyphosphoric acids and/or polyphosphate salts, and regenerate the amine extractant.

In general, the leaching solvents suitable for use are those which are capable of leaching from the admixture those phosphoric acid constituents which are not in the form of amine-polyphosphoric acid complexes. In most cases, aqueous leaching solvents are preferred such as water and basic, acidic or neutral aqueous solutions. In addition, the choice of the leaching solvent is governed to a large extent by the type of phosphate values desired to be recovered in the leaching liquor and, in general, for use in leaching phosphate salts an aqueous solution containing any metal source can be used. In particular, for use in leaching phosphate salts as the phosphate values are those alkali metal, ammonium and alkaline earth metal sources which are capable of giving the desired alkali metal, ammonium or alkaline earth metal cation in the aqueous leach solvent. Such alkali metal sources include the salts, oxides and hydroxides such as $Na_2CO_3$, $NaHCO_3$, $NaCl$, $NaH_2PO_4$, $Na_2HPO_4$, $Na_3PO_4$, $NaOH$, $Na_2O$, $Na_2SO_4$, $NaNO_3$, $K_2CO_3$, $KCl$, $KNO_3$, $KOH$, $K_2O$, $Li_2CO_3$, $LiCl$, $LiNO_3$, $Li_2SO_4$, and the like, including mixtures thereof. Although alkali metal sources of cesium and rubidium can, in some cases, be used in practicing the invention, since they are relatively expensive and are not readily available, they are not preferred for use as the alkali metal sources. In addition, such ammonium sources include $NH_3$, $(NH_4)_2CO_3$, $(NH_4)HCO_3$, $(NH_4)H_2PO_4$, $(NH_4)_2HPO_4$, $(NH_4)_2SO_4$, $NH_4Cl$ and the like. Further, the alkaline earth metal sources include salt, oxides and hydroxides such as $CaCO_3$, $CaCl_2$, $Ca(OH_2)$, $CaO$, $Ca(NO_3)_2$, $CaHPO_4$, $MgO$, $MgCO_3$, $MgCl_2$, $Mg(NO_3)_2$, and the like, including mixtures of these. Although the alkaline earth metal sources as strontium and barium can, in some cases, be used in practicing this invention, since they are relatively expensive and are not readily available, they are not preferred for use as the alkaline earth metal sources.

For use in leaching the phosphate values from the admixture as phosphoric acids are aqueous solvents consisting essentially of water or an acidic aqueous solution. The amounts of the aqueous leaching solvent which are suitable depend upon, inter alia, the degree of phosphate removal desired, the particular amine-polyphosphoric acid complex formed and the like and can readily be determined by conducting equilibrium distribution tests on the particular leaching solvent, amine and condensed phosphoric acid to be used.

In general, the stripping solvents suitable for use are those which are capable of stripping the desired polyphosphate values, i.e., either as polyphosphoric acid and/or polyphosphate salts, from the amine-polyphosphoric acid complex. In most cases, aqueous stripping solvents are preferred such as water and basic, acidic neutral aqueous solutions. In some cases, the stripping mechanism appears to be a solubility mechanism such as the use of water as a stripping agent in which the polyphosphate value is more soluble than in the amine extractant; while in other cases the stripping mechanism seems to be a salt exchange mechanism such as the use of an acidic aqueous solution of hydrochloric acid in which the stripping mechanism is believed to be represented as, for example, when stripping an amine-pyrophosphoric acid complex, by the following:

$$[R_3N \cdot H_4P_2O_7] \text{ complex} + HCl \rightarrow [R_3N \cdot HCl] \text{ complex} + H_4P_2O_7$$

In addition, the choice of the stripping solvent is governed to a large extent by the type of polyphosphate values desired to be recovered in the strip liquor and, in general, for use in stripping polyphosphate salts an aqueous solution containing any metal source can be used. In particular, for use in stripping polyphosphate salts as the polyphosphate values are those alkali metals, ammonium, and alkaline earth metal sources which are capable of yielding the desired alkali metal, ammonium or alkaline earth metal cation in the aqueous strip solvent. Such alkali metal sources include the salts, oxides and hydroxides, such as $Na_2CO_3$, $NaHCO_3$, $NaCl$, $NaH_2PO_4$, $Na_2HPO_4$, $Na_3PO_4$, $NaOH$, $Na_2O$, $Na_2SO_4$, $NaNO_3$, $K_2CO_3$, $KCl$, $KNO_3$, $KOH$, $K_2O$, $Li_2CO_3$, $LiCl$, $LiNO_3$, $Li_2SO_4$, and the like, including mixtures thereof. Although alkali metal sources of cesium and rubidium can, in some cases, be used in practicing this invention, since they are relatively expensive and are not readily available, they are not preferred for use as the alkali metal sources. In addition, such ammonium sources include $NH_3$, $(NH_4)_2CO_3$, $(NH_4)HCO_3$, $(NH_4)H_2PO_4$, $(NH_4)_2HPO_4$, $(NH_4)_2SO_4$, $NH_4Cl$ and the like, including mixtures of these. Further, the alkaline earth metal sources include salts, oxides and hydroxides such as $CaCO_3$, $CaCl_2$, $Ca(OH_2)$, $CaO$, $Ca(NO_3)_2$, $CaHPO_4$, $MgO$, $MgCO_3$, $MgCl_2$, $Mg(NO_3)_2$, and the like, including mixtures of these. Although the alkaline earth metal sources of strontium and barium can, in some cases, be used in practicing this invention, since they are relatively expensive and are not readily available, they are not preferred for use as the alkaline earth metal sources.

For use in stripping polyphosphoric acids as the polyphosphate values are aqueous solvents consisting essentially of water or an acidic aqueous solution of an acid which is stronger than the phosphoric acid constituent which is to be stripped and which, in general, includes such inorganic acids as hydrochloric acid, sulfuric acid, nitric acid, and the like. The amounts of the aqueous stripping solvent which are suitable depend upon, inter alia, the degree of polyphosphate value removal desired, the particular amine extractant and condensed phosphoric acid used and the like and can readily be determined by conducting equilibrium distribution tests on the particular stripping solvent, amine and condensed phosphoric acid to be used.

Other methods which can be used to strip the desired polyphosphate values from the amine-polyphosphoric acid complex include treating the complex with a gas, such as anhydrous ammonia, by bubbling through the complex and thereby precipitating the polyphosphate values as ammonium polyphosphates. This method of stripping can also result in the regeneration of the amine for further use.

Reference will now be made to the accompanying drawing, FIGURE 1, which illustrates diagrammatically the operation and various stages of the leaching method according to one of the preferred forms of the invention utilizing water as the aqueous leach solvent.

Figure 1:
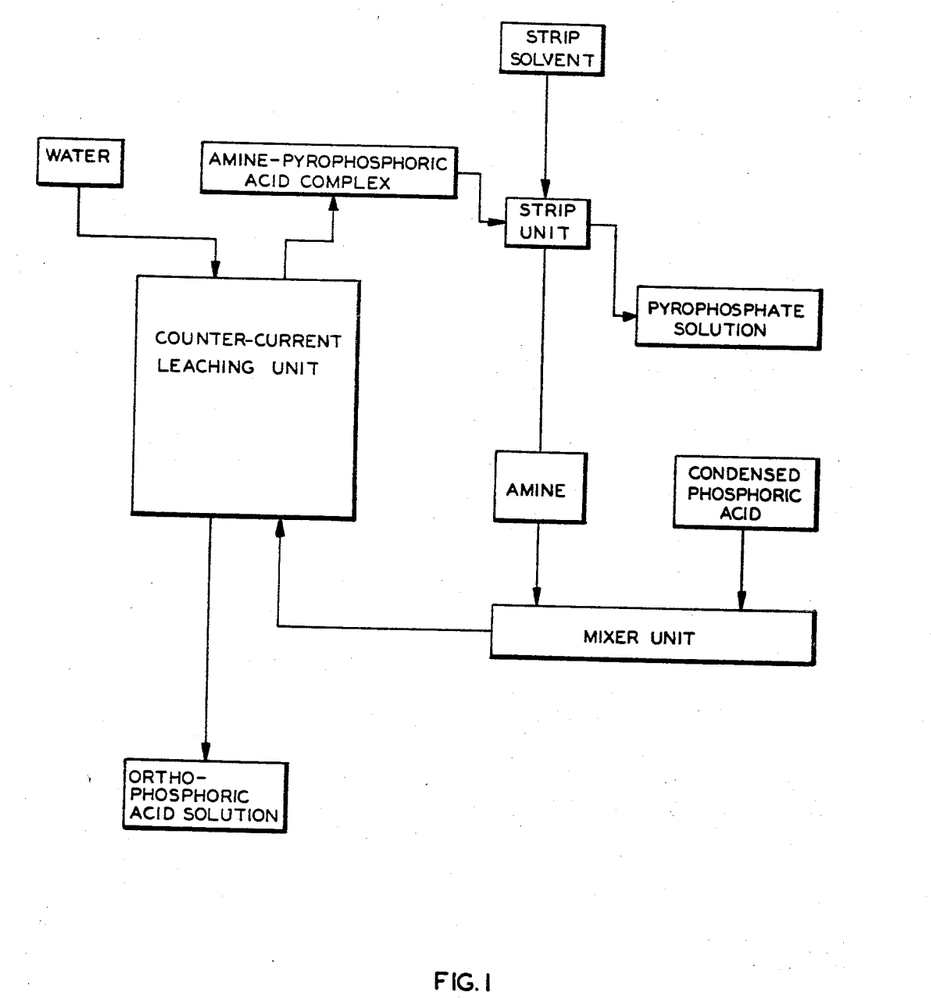

In carrying the invention into effect according to a preferred embodiment thereof as indicated in FIGURE 1, of the drawing, an amide (tri-n-octylamine), preferably dissolved in an organic diluent (xylene) in about a 10% concentration, and a condensed phosphoric acid, such as an orthophosphoric and pyrophosphoric acid mixture, are admixed in the mixing unit. The amine is preferably used in amounts which can form the amine-pyrophosphoric acid complex. The admixture is passed to a multi-stage countercurrent leaching unit and leached with water as the aqueous solvent. The water leaches the orthophosphoric acid from the admixture and the amine-pyrophosphoric acid complex is passed from the leaching unit to a stripping unit. In this unit an aqueous strip solvent (about a 60% solution of KOH) strips the pyrophosphoric acid from the amine, thereby regenerating the amine for further use. The potassium pyrophosphate solution can be further processed, if desired, to recover such compounds as tetrapotassium pyrophosphate from the aqueous solution by various methods, such as, removing the water by evaporation, including vacuum evaporation, precipitating by the addition of a miscible solvent in which the potassium pyrophosphate salts are less soluble, such as methanol, ethanol, acetone, etc., and the like.

II. FRACTIONATING METHOD

In general, the fractionating method comprises utilizing the amine extractant, preferably dissolved in an organic diluent, to extract from a condensed phosphoric acid a desired acid constituent by forming the desired amine-polyphosphoric acid complex and passing this complex to a stripping unit for recovery of the desired polyphosphoric acid and the regeneration of the amine for further use. This method is highly dependent upon the concentration of the condensed phosphoric acid and, in general, the condensed phosphoric acid should contain at least about 85% by weight of water, i.e., a relatively dilute condensed phosphoric acid, and preferably contain about 92% to about 99% by weight of water. The use of the relatively dilute condensed phosphoric acid is believed necessary in this method in order to prevent or minimize the solvating mechanism, i.e., Equation 5 supra, and permit the extraction of the desired polyphosphoric acid constituent relatively free of other constituent acids. The exact concentrations for optimum results depends upon, inter alia, the type of amine used and condensed phosphoric acid used, but can readily be determined by equilibrium distribution tests on the particular amine extractant and condensed phosphoric acid to be used.

In general, the stripping solvents which are suitable for use in the leaching method as previously described are suitable in the fractionating method and, therefore, the foregoing relating to the stripping operation in the leaching method is also applicable to the stripping operation in the fractionating method.

It should further be noted that the orthophosphoric acid exiting from the extraction operation is usually relatively dilute and, therefore, it is often desirable to concentrate this acid by contacting the acid with an amine extraction, forming amine-orthophosphoric acid complex, and stripping this complex with a suitable aqueous strip solvent to regenerate the amine and recover the phosphoric acid.

References will now be made to the accompanying drawing, FIGURE 2, which illustrates diagrammatically the operation and various stages of the fractionating method according to one of the preferred forms of the invention.

Figure 2:
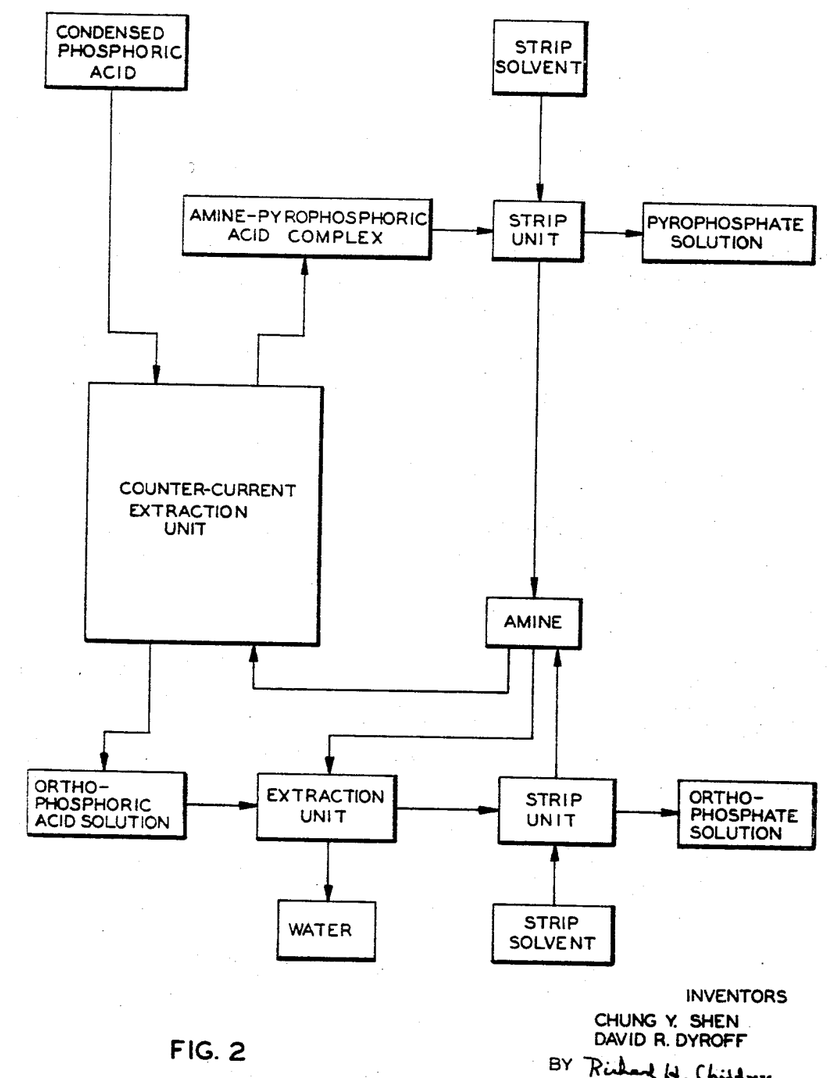

In carrying the invention into effect according to a preferred embodiment thereof as indicated in FIGURE 2 of the drawing, an amine (tri-n-octyl amine), preferably dissolved in an organic diluent (xylene) in about 10% concentration, is contacted with a condensed phosphoric acid, such as an orthophosphoric acid and pyrophosphoric acid mixture, in a counter-current extraction unit. The amine is preferably used in amounts which can form the amine-pyrophosphoric acid complex and the acid concentration and pH of the equilibrium aqueous phase are also controlled for the amine-pyrophosphoric acid complex formation. The amine-pyrophosphoric acid complex composition is passed to the stripping unit where an aqueous strip solvent (about a 60% solution of KOH) strips the pyrophosphoric acid from the amine, thereby regenerating the amine for further use. The potassium pyrophosphate solution can be further processed, if desired, to recover such compounds as tetrapotassium pyrophosphate from the aqueous solution by various methods, such as removing the water by evaporation, including vacuum evaporation, precipitating by the addition of a miscible solvent in which the potassium pyrophosphate salts are less soluble, such as methanol, ethanol, acetone, etc., and the like. It is preferred that the exiting orthophosphoric acid solution from the extraction unit be concentrated further by use of an amine extractant to form an amine extractant phase and a barren aqueous phase by extracting the phosphoric acid into the amine extractant phase and thereafter stripping, in a strip unit, the amine extractant with an aqueous solvent, such as water, to remove the phosphoric acid from the amine and regenerate the amine for further use.

Although the following examples illustrated herebelow are for relatively pure condensed phosphoric acids, such as furnace grade condensed phosphoric acid, and, in general, pertain to the extraction of pyrophosphoric acid and/or tripolyphosphoric acid from a condensed phosphoric acid containing orthophosphoric acid, pyrophosphoric acid and tripolyphosphoric acid, it should be appreciated that the novel selective extraction techniques and concepts used herein can apply to various condensed phosphoric acids containing various impurities, such as condensed phosphoric acid derived from wet process acid and the examples are presented for illustrative purposes only.

Example I

This example illustrates the leaching method as previously described when carried out at room temperature, i.e., about 25° C. An admixture consisting of about 140 parts of tri-n-octyl amine, about 190 parts of a xylene solvent and about 210 parts of condensed phosphoric acid of about 76% $P_2O_5$ by weight and comprising about 60% $H_3PO_4$, about 36% $H_4P_2O_7$ and about 4% higher polyphosphoric acids by weight was fed to a seven stage counter-current extraction unit. Water was used as the aqueous leaching solvent. The results for each stage are presented in the following table.

TABLE 1

| Stage No. | Aqueous Phase, g. | | | Organic Phase, g. | | | | |
|---|---|---|---|---|---|---|---|---|
| | $H_2O$ | $H_4P_2O_7$* | $H_3PO_4$ | $R_3N$ | Solvent | $H_4P_2O_7$* | $H_3PO_4$ | $H_2O$ |
| Enter | | | | 7.9 | 27.6 | 4.23 | 7.83 | .23 |
| 1 | 8.65 | 1.86 | 8.0 | 7.9 | 27.6 | 3.55 | 4.45 | .12 |
| 2 | 9.0 | 1.21 | 4.62 | 7.9 | 27.6 | 2.57 | .98 | .12 |
| 3 | 9.0 | .23 | 1.15 | 7.9 | 27.6 | 2.50 | .42 | .12 |
| 4 | 9.0 | .16 | .59 | 7.9 | 27.6 | 2.56 | .18 | .12 |
| 5 | 9.0 | .22 | .18 | 7.9 | 27.6 | 2.50 | .08 | .12 |
| 6 | 9.0 | .16 | .08 | 7.9 | 27.6 | 2.47 | 0 | .12 |
| 7 | 9.0 | .13 | 0 | 7.9 | 27.6 | 2.34 | 0 | .12 |
| Enter | 9.0 | 0 | 0 | | | | | |

*$H_4P_2O_7$ contains some higher polyphosphoric acids.

As can be observed from the above table, the organic phase contained after counter-current leaching with water about 55% of the pyrophosphoric acid contained in the starting amine-condensed acid admixture as well as containing no detectable orthophosphoric acid which indicates the degree of selectivity possible when following the concepts of the present invention.

Example II

This example illustrates the leaching method as previously described in Example I when carried out at a temperature of about 50° C. and using a four stage countercurrent extraction unit. The results for each stage are presented in the following table:

TABLE 2

| Stage No. | Aqueous Phase, g. | | | Organic Phase, g. | | | | |
|---|---|---|---|---|---|---|---|---|
| | H₂O | H₄P₂O₇* | H₃PO₄ | R₃N | Solvent | H₄P₂O₇* | H₃PO₄ | H₂O |
| Enter | | | | 7.9 | 27.6 | 4.23 | 7.83 | .22 |
| 1 | 8.67 | 2.36 | 7.68 | 7.9 | 27.6 | 3.13 | 3.26 | .1 |
| 2 | 9.0 | 1.26 | 3.11 | 7.9 | 27.6 | 2.31 | .58 | .1 |
| 3 | 9.0 | .44 | .43 | 7.9 | 27.6 | 1.87 | .15 | .1 |
| 4 | 9.0 | 0 | .15 | 7.9 | 27.6 | 1.87 | 0 | .1 |
| Enter | 9.0 | 0 | 0 | | | | | |

*H₄P₂O₇ contains some higher polyphosphoric acids.

As can be observed from the above table, the organic phase contained after counter-current leaching with water about 44% of the pyrophosphoric acid contained in the starting amine-condensed acid admixture as well as containing no detectable orthophosphoric acid which indicates the degree of selectivity possible when following the concepts of the present invention.

Example III

This example illustrates the fractionating method as previously described. The amine extractant is comprised of tri-n-octyl amine and a xylene solvent. The amine extractant and dilute polyphosphoric acid analyzing as indicated were contacted in a 2 stage counter-current extraction unit. The results are presented in the following table.

TABLE 3.—PYROPHOSPHORIC ACID EXTRACTION

| | Aqueous Phase, g. | | | Organic Phase, g. | | | | |
|---|---|---|---|---|---|---|---|---|
| | H₂O | H₃PO₄ | H₄P₂O₇ | R₃N | Solvent | H₄P₂O₇ | H₃PO₄ | H₂O |
| Enter | 230 | 8.03 | 4.42 | 16.1 | 56.3 | | | |
| Exit | 229.8 | 8.03 | .42 | 16.1 | 56.3 | 3.81 | | .2 |

As can be observed from the above table, the organic phase contained after the extraction about 85% of the pyrophosphoric acid contained in the starting condensed phosphoric acid as well as containing no detectable orthophosphoric acid which indicates the degree of selectivity possible when following the concepts of the present invention.

What is claimed is:

1. A method for separating polyphosphoric acid having at least two phosphorus atoms in each molecule from condensed phosphoric acid having a P₂O₅ content of greater than about 69% by weight comprising contrasting said condensed phosphoric acid with a water-insoluble amine compound containing a terminal polar nitrogen containing group and at least one hydrophobic substituent group, forming an amine polyphosphoric acid complex with said polyphosphoric acid and recovering said amine polyphosphoric acid complex.

2. A method according to claim 1 wherein said amine is dissolved in an organic diluent.

3. A method according to claim 1 wherein said condensed phosphoric acid is an aqueous diluted condensed phosphoric acid having a concentration of no greater than about 15% by weight.

4. A method according to claim 1 wherein said recovery step comprises contacting said amine polyphosphoric acid complex and the uncomplexed acid with an aqueous leaching solvent whereby said uncomplexed acid is separated from said amine polyphosphoric acid complex.

5. A method according to claim 1 wherein said water-insoluble amine compound has the following formula wherein R₁ and R₂ are members selected from the class consisting of saturated and ethylenically unsaturated aliphatic hydrocarbyl groups containing from about 7 to about 15 carbon atoms and R₃ is a member selected from the class consisting of hydrogen and saturated and ethylenically unsaturated aliphatic hydrocarbyl groups containing from 1 to about 18 carbon atoms.

6. A method according to claim 5 wherein said amine compound is dissolved in an organic diluent.

7. A method according to claim 5 wherein said amine compound is tricaprylyl amine.

8. A method according to claim 5 wherein said condensed phosphoric acid is an aqueous diluted condensed phosphoric acid having a concentration of no greater than about 15% by weight.

9. A method according to claim 5 wherein said recovery step comprises contacting said amine polyphosphoric acid complex and the uncomplexed acid with an aqueous leaching solvent whereby said uncomplexed acid is separated from said amine polyphosphoric acid complex.

10. A method according to claim 9 wherein after said separation step, said amine polyphosphoric acid complex is stripped with an aqueous strip solvent whereby the polyphosphate values of said amine polyphosphoric acid complex are recovered and said amine is regenerated for further use.

11. A method according to claim 1 wherein said amine compound is a water-insoluble quaternary ammonium compound of the following formula wherein R₁ and R₂ are members selected from the class consisting of saturated and ethylenically unsaturated aliphatic hydrocarbyl groups containing from about 7 to about 15 carbon atoms, R₃ is a member selected from the class consisting of saturated and ethylenically unsaturated aliphatic hydrocarbyl groups from 1 to about 18 carbon atoms, and R₄ is a member selected from the class consisting of saturated and ethylenically unsaturated aliphatic hydrocarbyl groups from 1 to about 15 carbon atoms.

12. A method according to claim 11 wherein said ammonium compound is dissolved in an organic diluent.

13. A method according to claim 11 wherein said ammonium compound is dimethyl dioctyl ammonium hydroxide.

14. A method according to claim 11 wherein said recovery step comprises contacting said amine polyphosphoric acid complex and the uncomplexed acid with an aqueous leaching solvent whereby said uncomplexed acid is separated from said amine polyphosphoric acid complex.

15. A complex of a water-insoluble organic amine compound and polyphosphoric acid, said complex stabilizing said polyphosphoric acid against hydrolytic degradation and reorganization, said organic amine compound containing a terminal polar nitrogen containing group and at least 1 hydrophobic substituent group, said organic amine compound being present in amounts of at least 1 mole per mole of polyphosphoric acid and said complex exhibiting an infrared absorption spectrum characteristic of polyphosphate linkages and amine-salt formation.

16. A complex of a water-insoluble organic amine compound and polyphosphoric acid, said complex stabilizing said polyphosphoric acid against hydrolytic degradation and reorganization, said amine-polyphosphoric acid complex having the formula wherein $R_1$ and $R_2$ are members selected from the class consisting of saturated and ethylenically unsaturated aliphatic hydrocarbyl groups containing from about 7 to about 15 carbon atoms and $R_3$ is a member selected from the class consisting of hydrogen and saturated and unsaturated aliphatic hydrocarbyl groups containing from 1 to about 18 carbon atoms, $n$ is an integer from 2 to about 10 and $x$ is an integer from 1 to $n$, said complex exhibiting an infrared absorption spectrum characteristic of polyphosphate linkages and amine-salt formation.

17. A complex of tricaprylyl amine and pyrophosphoric acid, said complex stabilizing said pyrophosphoric acid against hydrolytic degradation and reorganization, said amine complex exhibiting an infrared absorption spectrum characteristic of pyrophosphate linkages and amine-salt formation.

18. A complex of an organic amine compound and polyphosphoric acid, said complex stabilizing said polyphosphoric acid against hydrolytic degradation and reorganization, said amine-polyphosphoric acid complex having the formula wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated aliphatic hydrocarbyl groups from 1 to about 18 carbon atoms, and $R_4$ is a member selected from the class consisting of saturated and ethylenically unsaturated hydrocarbyl groups from 1 to about 15 carbon atoms, $n$ is an integer from 2 to about 10 and $x$ is an integer from 1 to $n$, said complex exhibiting an infrared absorption spectrum characteristic of polyphosphate linkages and amine-salt formation.

19. A complex of dimethyl dioctyl ammonium hydroxide and pyrophosphoric acid, said complex stabilizing said pyrophosphoric against hydrolytic degradation and reorganization, said complex exhibiting an infrared absorption spectrum characteristic of pyrophosphate linkages and amine-salt formation.

References Cited

UNITED STATES PATENTS

| | | | |
|---|---|---|---|
| 3,186,809 | 1/1965 | Kreevoy et al. | 23—312 |
| 3,298,782 | 1/1967 | Archambault | 23—165 |
| 3,304,157 | 2/1967 | Baniel et al. | 23—165 |
| 3,308,161 | 3/1967 | Shen | 260—583 |

OSCAR R. VERTIZ, *Primary Examiner.*

L. A. MARSH, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,408,158                      October 29, 1968

David R. Dyroff et al.

It is certified that error appears in the above identified patent and that said Letters Patent are hereby corrected as shown below:

Column 4, line 58, the formula should read -- $[(C_{12}H_{23})_2(CH_3)_2N]^+OH^-$ --; line 61, the formula should read -- $[(C_{12}H_{23})_3(C_4H_9)N]^+OH^-$ --. Column 7, line 51, the formula should read -- $[[CH_2(CH_2)_7]_2(CH_3)N]_2-H_{12}P_{10}O_{31}$ --; line 59, the formula should read -- $[(C_3H_{27})_3N]_2-H_{10}P_8O_{25}$ --. Column 13, lines 48 and 49, "contrasting" should read -- contacting --.

Signed and sealed this 10th day of March 1970.

(SEAL)
Attest:

Edward M. Fletcher, Jr.                  WILLIAM E. SCHUYLER, JR.
Attesting Officer                          Commissioner of Patents